US006132821A

United States Patent [19]

Garr

[11] Patent Number: 6,132,821

[45] Date of Patent: Oct. 17, 2000

[54] SCULPTED WALL ADORNMENT

[76] Inventor: Dan A. Garr, 7573 McConnell Ave., Los Angeles, Calif. 90045

[21] Appl. No.: 09/159,445

[22] Filed: Sep. 24, 1998

[51] Int. Cl.[7] .................................................. A01W 1/00

[52] U.S. Cl. .......................... 428/15; 428/546.6; 428/16; 428/39; 428/42.1; 428/343; 428/15; 428/904.4; 428/542.2; 446/372; 446/901; 446/369; 446/371; 446/268; 21/148; 21/151; 21/159

[58] Field of Search ................................... 428/546.6, 16, 428/39, 42.1, 343, 15, 904.4, 542.2; 446/372, 901, 369, 371, 268; D21/148, 151, 159

[56] References Cited

U.S. PATENT DOCUMENTS

| | | | |
|---|---|---|---|
| 3,829,998 | 8/1974 | Flax | 40/124.1 |
| 3,847,715 | 11/1974 | Goodspeed | 161/7 |
| 4,016,314 | 4/1977 | Cowans et al. | 428/35 |
| 4,813,329 | 3/1989 | Griffin | 84/94.2 |
| 4,937,107 | 6/1990 | Mirisch, Sr. | 428/7 |
| 5,196,246 | 3/1993 | Kauss et al. | 428/39 |
| 5,439,538 | 8/1995 | Perry | 156/63 |
| 5,470,410 | 11/1995 | Keating et al. | 156/63 |
| 5,491,006 | 2/1996 | Johnson et al. | 428/13 |
| 5,498,455 | 3/1996 | Roberts | 428/40 |
| 5,523,129 | 6/1996 | McGeehan-Hatch | 428/13 |
| 5,613,764 | 3/1997 | O'Brien | 362/252 |
| 5,722,209 | 3/1998 | Delaney et al. | 52/455 |
| 5,786,044 | 7/1998 | Hauge | 428/8 |

*Primary Examiner*—Deborah Jones
*Assistant Examiner*—Abraham Bahta
*Attorney, Agent, or Firm*—Knobbe, Martens, Olson & Bear, LLP

[57] ABSTRACT

A three-dimensional soft sculpture wall adornment is made of a pliable and lightweight material. The wall adornment has a raised relief front surface and a back that is at least partially flat. The raised relief has a minimum total relief contrast that assures a three-dimensional visual quality. The raised relief also has a maximum projection. The back has a mounting element attached to the flat portion for securing the wall adornment to a wall.

22 Claims, 5 Drawing Sheets

SCULPTED WALL ADORNMENT

BACKGROUND OF THE INVENTION

1. Field of the Invention

The present invention generally relates to wall decorations. In particular, the present invention relates to lightweight soft sculptures adapted to be removably affixed to walls.

2. Description of Related Art

Children's rooms, particularly those occupied by infants, are desirably decorated in bright colors and playful motifs. The decorations are important because during the first five months of life, an infant learns about her environment almost entirely through vision. As the child grows older, the focus of the decorating shifts to entertaining and comforting the child by portraying a positive and caring environment. Moreover, varying the surrounding environment and décor of a room fosters the intellectual stimulation of children of all ages. Accordingly, it is preferable to decorate a child's room such that the furnishings and decorations can be frequently moved and repositioned without damaging or marring the floors, ceilings and walls.

It is well known that the décor of a room can be physically altered in various fashions. For instance, the furniture can be rearranged or the color scheme of the walls altered through painting or papering. Using decorations, such as, for example, pictures, appliques, ornaments, and the like, some of which may mount on the wall can also change the déor of the room. The decorations are typically two-dimensional and shaped or configured to correspond to a desired decorative scheme. These decorations are typically relatively heavy and require a permanent-mounting element. Specifically, when mounting such decorations, nails and pushpins are commonly utilized. These fasteners necessarily leave behind tell-tail holes once removed. These holes eventually necessitate expensive and burdensome patching. Thus, a major draw back to securely hanging heavy wall decorations is the requirement to pierce the skin of the wall with a mechanical fastener.

Additionally, some of the two-dimensional wall ornaments are designed to be stacked to form a sort of three-dimensional appearance. These sometimes involve smaller component pieces that are layered onto larger background components. While certainly appropriate for older children, these smaller pieces are not recommended for use with infants and toddlers. Additionally, many of the two-dimensional wall ornaments are thin and create a risk of cuts and torn pieces. The torn pieces can create a choking-hazard to infants and toddlers.

In some instances, three-dimensional wall ornaments have been utilized to decorate a generally planar wall surface. The three-dimensional effect creates a desirable and exciting new visual effect on an otherwise ordinary wall. Infants can appreciate the contrast in color between such a wall ornament and the typically bland background color utilized in most modern houses. Additionally, the infants appreciate the varied degrees of projection provided by the three-dimensional relief attributes. Older children marvel at the three-dimensional figure embellishing their wall and often involve such a figure in their activities though "pretending" without actually touching or moving the figure.

While the three-dimensional structure is desired, the extent of structural relief can also become a problem when dealing with infants and older children. The wall hangings are typically found on walls either above or proximate a playpen or crib of an infant or toddler. Too much relief can result in an unsafe amount of weight being cantilevered from the wall such that the ornament is often secured in a semi-permanent or permanent fashion to reduce the risk of the ornament crashing downward under its own weight. Additionally, too much relief can result is a surreal physical appearance of the sculpture of the casting of severe shadows by the sculpture due to localized light sources. These problems are illustrated by the mounting of a half of a stuffed animal on the wall. The unnatural appearance and harsh shadows can frighten infants and toddlers in the absence of a caring and comforting parent figure. Thus, the goal of achieving a comforting décor is defeated.

Regarding toddlers and older children, too much relief invites grasping and hanging on the wall ornament. As a result, the ornament must be arranged out of the child's reach or very securely fastened to the wall. This limits the placement and may require that the ornament be placed high up on a wall in an unattractive position above a bed, playpen or crib. The high placement can also remove the ornament from the typical lines of sight of the infant or smaller children, which inhibits the goal of creatively decorating the child's room for their visual stimulation.

Prior materials used in making three-dimensional wall ornaments had several drawbacks. Typically, the three dimensional wall ornaments have been made of wood, plaster, a vacuum-formed plastic material, fiberglass and the like. These materials, as is well known, are hardened and dense with the exception of the vacuum-formed plastic and fiberglass. The heavy weight of wood, plaster and other similar materials can endanger an infant or child if the ornament drops form the wall The vacuum-formed plastic and fiberglass, on the other hand, can be lightweight but usually these materials are characterized as brittle, toxic or sharp when cut, broken or torn. Additionally, the manufacturing tolerance stack-ups involved in making objects via vacuum forming or glassing can result in a sloppy end product. The vacuum-formed product also has a reduced aesthetic value due to its translucent or transparent appearance and the required flashing which results. Additionally, the brittle nature of plastics used in vacuum forming can result in the infant or child breaking the ornament or, worse yet, cutting herself on a sharp edge or corner of the ornament. Similarly, fiberglass sculptures, which may be toxic, may also have sharp edges when manufactured or broken.

Thus, the materials previously utilized may cultivate discomfort among parents while cultivating a curious and creative mind of a child. The discomfort of the parent is based, in part, on the hard, heavy, toxic and possibly brittle or sharp, nature of the materials utilized in these decorations. These are not the types of materials a parent confidently utilized in decorating a room for their beloved child.

SUMMARY OF THE INVENTION

Previously, an attempt was made to create a wall hanging by cutting a stuffed toy in half and mounting the toy to the wall. However, this wall hanging suffered from drawbacks as well. The stuffing could become dislodged which also became a major choking hazard for children. Additionally, the plush coat of the stuffed toy was difficult to clean and was not waterproof or liquid resistant. Furthermore, the stuffed toy was dimensionally inappropriate for such a mounting as will be described in detail below. Thus, the stuffed toy did not result in a satisfactory three-dimensional wall adornment for children.

Accordingly, there is still a need for a three-dimensional wall adornment suitable for use in a room occupied by infants, toddlers and small children. The wall adornment should have adequate relief to accurately portray the three-dimensional figure while limiting the relief to reduce grasping surfaces and harsh shadow-effects. The wall adornment should also be made from a child-friendly material (i.e., soft, pliant, chew-resistant and lightweight).

Accordingly, one aspect of the present invention involves a soft sculpture wall adornment having a pliable unitary portion. A mounting plane is defined by a plurality of points adapted to abut against a surface against which the wall adornment is mountable. A contrast reference plane is substantially parallel to the mounting plane and contains at least one point of the front surface closest to the mounting plane. Also, the raised front surface has varying levels of relief relative to the reference plane. The front surface also has a minimum total contrast of about 0.5 inches such that a three-dimensional effect is achieved.

Another aspect of the present invention involves a soft sculpture wall adornment having a varying relief portion and a mounting surface. A mounting plane is defined by a plurality of points adapted to abut against a surface against which the wall adornment is mountable. A contrast reference plane is substantially parallel to the mounting plane and contains at least one point of the front surface closest to the mounting plane. The varying relief portion is preferably pliable and lightweight. The varying relief portion also is a single element and has varying surface heights relative to the reference plane. A minimum average total relief contrast of about 0.5 inches is provided on the varying relief portion such that a three-dimensional effect is achieved by a substantial portion of the varying relief portion.

A further aspect of the present invention involves a method of manufacturing a soft sculpture wall adornment. The method involves creating a three-dimensional relief of the desired soft sculpture. The method also involves preparing a negative mold from the three-dimensional relief and preparing a hard model from the negative mold. A blister mold is prepared from the hard model and foam is injected into the blister mold. Finally, the soft sculpture is removed from the mold.

Yet another aspect of the present invention involves a method of making a soft sculpture wall adornment. The method involves coating a mold with a barrier coat and pre-coloring a foam material. The foam is injected into the coated mold. Finally, the method involves removing the soft sculpture from the mold.

BRIEF DESCRIPTION OF THE DRAWINGS

These and other features, aspects and advantages of the present invention will now be described with reference to the drawings of a preferred embodiment that is intended to illustrate and not to limit the invention, and in which.

DETAILED DESCRIPTION OF THE PREFERRED EMBODIMENT

Figure 1:
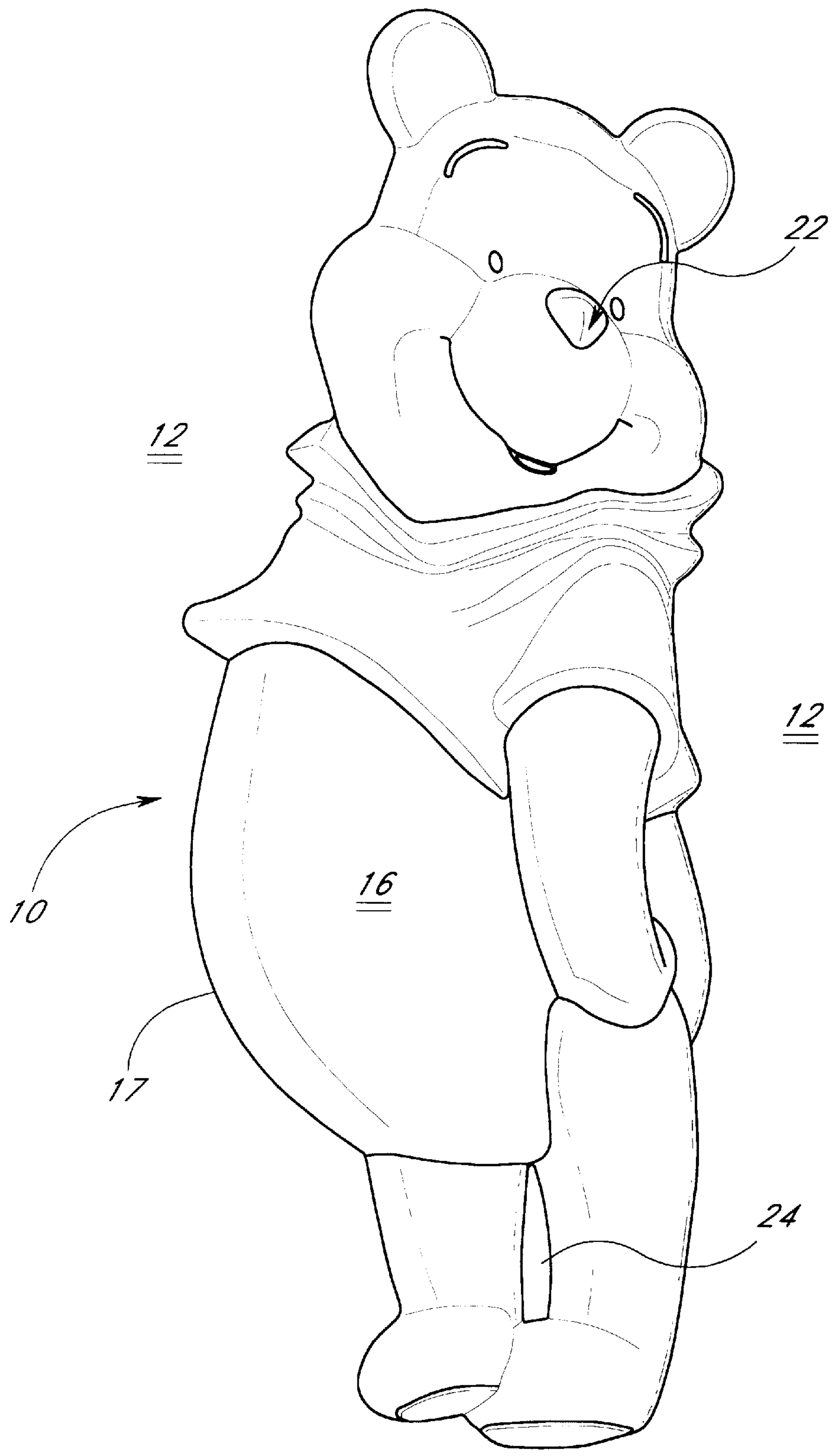
FIG. 1 is a perspective view of a soft sculpture wall adornment having features, aspects and advantages in accordance with the present invention.

With reference to FIG. 1, an embodiment of a soft sculpture wall adornment 10 having features, aspects and advantages in accordance with the present invention is illustrated. While the illustrated embodiment is of a bear, one of ordinary skill in the art will readily recognize that the present soft sculpture wall adornment 10 is not limited to this embodiment, but can be utilized with a soft sculpture wall adornment 10 of any other desired shape, character, or figure. Additionally, it is recognized that the wall adornment 10 can form a portion of a larger adornment (i.e., in a puzzle type adornment) and that the adornment 10 may also comprise a unitary portion that is not made up of other individually distinguishable elements.

The illustrated wall adornment 10 is a three-dimensional soft sculpture that is adapted to be mounted on a wall 12. The soft sculpture 10 can be similar to be bas-relief genre of sculpture in appearance, but need not be so limited in projection or relief contrast. A bas-relief is generally defined as a sculptural relief in which the projection from the surrounding surface is slight and no part of the modeled form is undercut. The extent of relief contrast i the present soft sculpture wall adornment 10 need not be merely “slight.” Preferbly, in fact, the extent of relief contrast is not slight.

While it is important to the present wall adornment that the relief contrast and the projection of the illustrated wall adornment 10 is not slight, the actual projection 14 (FIG. 3) is desirably limited (i.e., the projection 14 has a limited projection distance, D). The projection distance D is measured from a raised front surface 16 to a plane A that comprises the mounting plane of the adornment (i.e., the plane defined by the points of the adornment that are adapted to abut against the surface against which the wall adornment is mounted). Preferably, the mounting plane A contains a continuous rear edge 17 of the front surface 16 and, more preferably, the plane is coplanar with a flat rear mounting surface 18 of the wall adornment. The raised front surface 16 forms a varying relief portion of the adornment 10. The limited projection distance D results in better weight distribution for hanging and better appearances from all angles when compared with a completely accurate three-dimensional reproduction. Specifically, the completely accurate three-dimensional reproduction results in unappealing appearance from several vantage points which are not directly head-on. For instance, certain high projection elements may shield other elements depending upon the angle with which the prior designs are viewed. Additionally, if the wall adornment 10 projects too far outward from the wall 12, it could become accidentally knocked free from its position on the wall 12. One important aspect of the soft sculpture wall adornment has a maximum projection of about 3 inches. More preferably, the maximum projection should be less than about 1.5 inches. Thus, with reference to FIG. 1, this preferred structure of the present invention creates a desirable appearance for a wider viewing angle range. This limited projection 14 also significantly reduces any harsh shadows associated with completely accurate three-dimensional reproductions.

With again to reference to FIG. 1, the illustrated embodiment exemplifies how the limited projection 14 will enables the soft sculpture wall adornment 12 to convey a sense of depth and proportionality in all three dimensions. Importantly, this sense of proportionality is created in significant part due to a total relief contrast 20. Thus, one important aspect of the present invention involves a total relief contrast 20 of more than about 0.5 inches. More preferably, the total relief contrast 20 should be at least about 1.5 inches. The total relief contrast is the distance between the highest peak and the lowest valley present on the front surface of the wall adornment. That is, the distance between the point of the front surface furthest from the mounting plane A and the point of the front surface closest to the mounting plane A. A contrast reference plane, R, is defined as a plane substantially parallel to the mounting plane and containing the point or points of the front surface 16 closest to the mounting plane A. In a presently preferred embodiment, the entire outer edge of the front surface 16 and the inner edge of the front surface defining a cutout 24 that is located between the legs of the illustrated embodiment are all essentially equidistant from the mounting plane A. Similarly, in a preferred embodiment, the mounting plane A and the reference plane R are essentially coplanar. While the total relief contrast 20 in the illustrated embodiment is the same as the projection distance D; in other embodiments, the total relief contrast 20 will be less than the projection distance D if the reference plane, R, is elevated away from the wall 12 and the mounting plane A.

Figure 2:
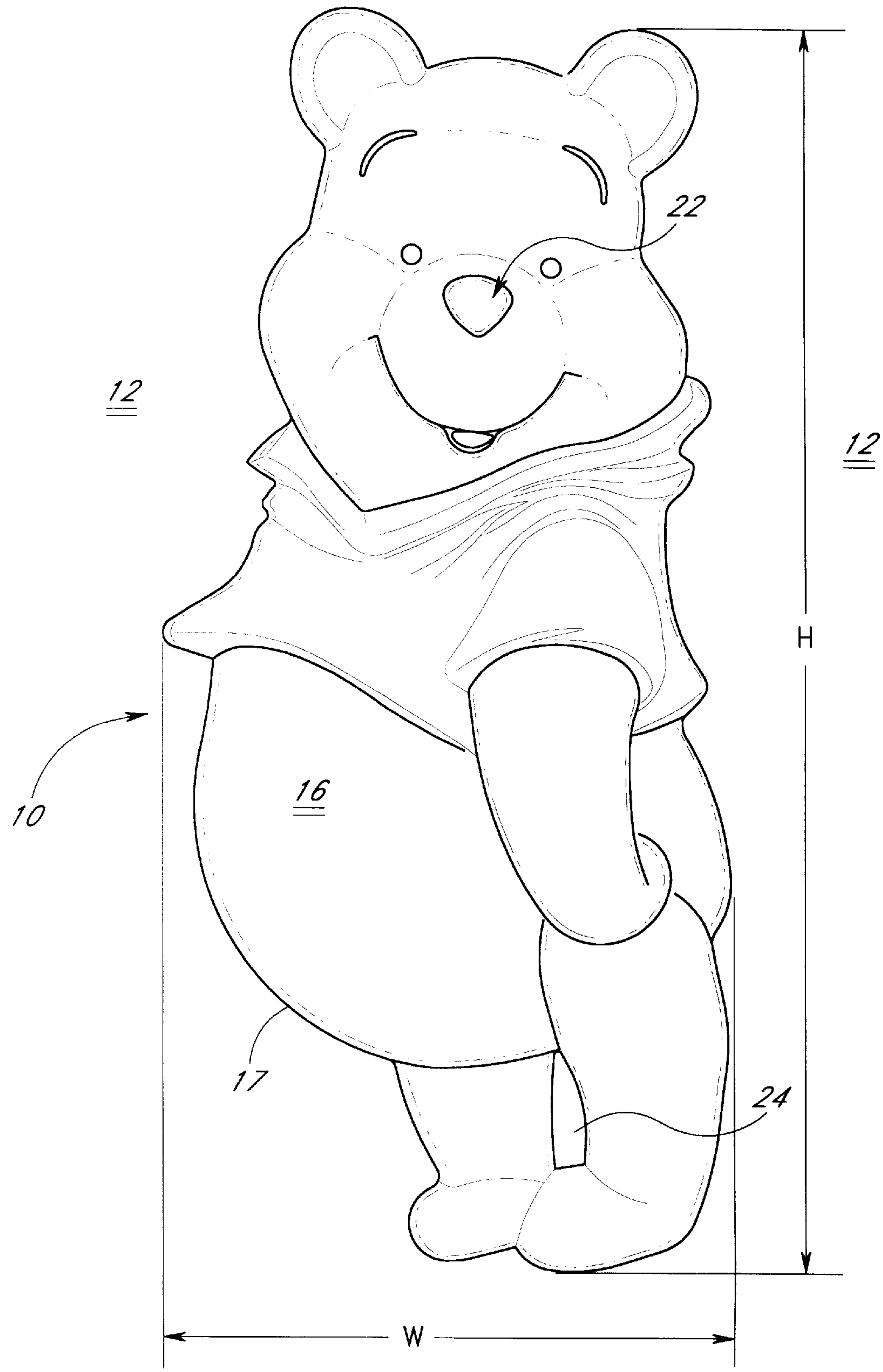
FIG. 2 is a front elevational view of the adornment of FIG. 1.

The wall adornment 10 is desirably not substantially flat with only a few projecting surfaces. Instead, the illustrated embodiment reflects the flowing changes in projection necessary to convey a total three-dimensional effect in the wall adornment 10. In this regard, another important aspect of the present soft sculpture wall adornment 10 involves providing a total average relief contrast of at least about 0.75 inches. As used herein, the total average relief contrast in an average of the distances from the contrast reference plane, R, to the front surface of the soft sculpture wall adornment over the entire front surface 16. In addition to the total and average relief contrast 20, it is also desirable that the soft sculpture wall adornment of the present invention present a large enough footprint to make a visual impact in its intended environment. As illustrated in FIG. 2, the height H and the width W of the soft sculpture wall adornment 10 define the footprint. Applicant has determined that the soft sculpture wall adornment 10 should have a minimum height H of at least about 5 inches to create a sufficient visual impact in the room of a small child. More preferably, however, to create the desired visual impact, the minimum height H should be at least about 10 inches. Because the present soft sculpture wall adornment 10 is desirably a high quality wall hanging that is safe for use around children, the materials utilized in manufacturing the adornment 10 are important. The material should be lightweight and tactilely appealing. Specifically, the materials should be soft and pliable. Moreover, the selected material should be tear-resistant and bite-resistant such that children should not be able to chew off a piece of the sculpture. Importantly, the chosen material should be non-toxic. Desirably, the selected material should also be waterproof, or liquid-resistant, such that the adornment may be easily cleaned and maintained. Further, the selected material should not be translucent.

The wall adornment 10 sculptural structure necessarily defines a volume of material that is dependent upon the chosen three-dimension shape and configuration. Moreover, the materials selected from which the sculpture is ultimately manufactured have a density. As will be recognized by those of skill in the art, the weight is a function of both the volume of material used and the density of the material used. In the illustrated embodiment, the material utilized is preferably a microcellular foam or the like, such as, for example, but without limitation, ethyl vinyl acetate, poly vinyl chloride, urethane, or styrene. Other material can also be, without limitation, BASF Corp. products such as elastopan S4014 or WUC3236T, Rubatex foams, PVC foams, open and closed cell foams, or rigid urethane foams. Preferably, the foam material has a density between about 6 and about 40 lbs./cu.ft. More preferably, the foam material has a density between about 26 and about 38 lbs./cu.ft. The density is importantly chosen with a concern for a resultant bite-resistance (i.e., whether a child can tear the material with teeth). Consequently, the materials selected above have been identified as having adequate bite-resistance for this application. Another aspect of the present invention involves maintaining a weight that is less than about 18 ounces to ensure that if the adornment does fall on to the child, the child will not be injured. More desirably, the weight is less than about 12 ounces. As discussed above, chance of injury is further reduced by the use of soft and pliable materials. To minimize the risk of injury, the adornment should have a maximum height of about 40 inches and, preferably, 18 inches.

While it is recognized that only a portion of the back 18 need be utilized as a flat mounting plane, the illustrated wall adornment 10 has a completely planar back surface 18. The mounting plane should provide sufficient surface area to allow at least one fastening element 30 to be attached. In addition, a flat back 18 advantageously aids mounting the wall adornment 10 because the exact positioning of each mounting element 30 is not important with the full back 18 available for mounting. Furthermore, the solid back 18 also eases the handling of the wall adornment 10 during manufacturing and increases the torsional and bending strength of the wall adornment 10 over a wall adornment having a central concavity.

Because of the desired lightweight construction, the illustrated embodiment can be suitably and removably secured to a desired surface through the use of double-sided adhesive elements 30. Accordingly, an aspect of the present invention involves providing the wall adornment with at least one double-sided adhesive element 30 that preferably comprises a dual tack structure. Providing one side of the element 30 with a higher tack than the other side creates the dual tack structure. This dual tack structure allows the adhesive element to more securely bond to the adornment 10 than to the surface 12 upon which the adornment 10 is mounted. Thus, when the adornment 10 is removed from the surface 12, the adhesive elements 30 are removed with the adornment 10. Desirably, the adhesive selected enables the adornment to be affixed to the surface 12 securely while still allowing the adornment and the associated adhesive to be removed without gumming or marring the surface. Preferably, the adhesive is a repositionable adhesive, such as, for example, but without limitation, 3-M products 9425 and 9429 which can carry a 45 oz./inch dual tack or a medium tack/low tack structure. The adhesive can be selected from any known and suitable adhesive. Additionally, as known by those of skill in the art, the adhesive elements 30 may also have a removable backing for use during shipping such that the backing is removed in order to mount the adornment 30.

While the illustrated embodiment is desirably manufactured from foam, the quality of the soft sculpture can vary significantly depending upon the type of foam utilized and the treatments given to the foam. Accordingly, another aspect of the present invention involves impregnating the foam with dye such that it resembles the main base color of the final soft sculpture. This dye impregnation helps to hide imperfections such as cracks and breaks in the paint, which can result from manufacturing and normal use of the soft sculpture. Additionally, the foam should be provided with a paint-receptive skin in the event that the foam is naturally porous or otherwise unable to receive and maintain coating of paint. The skin can also add to the overall pleasing appearance of the wall adornment. An elastic pain is advantageously utilized, according to another aspect of the present invention, to pain the soft sculpture in a manner described in detail below. Desirably, the pain utilized is at least twice as elastic as the foam to which it is applied; therefore, the paint will not crack as a result of bending stresses applied to the soft sculpture.

Figure 5:
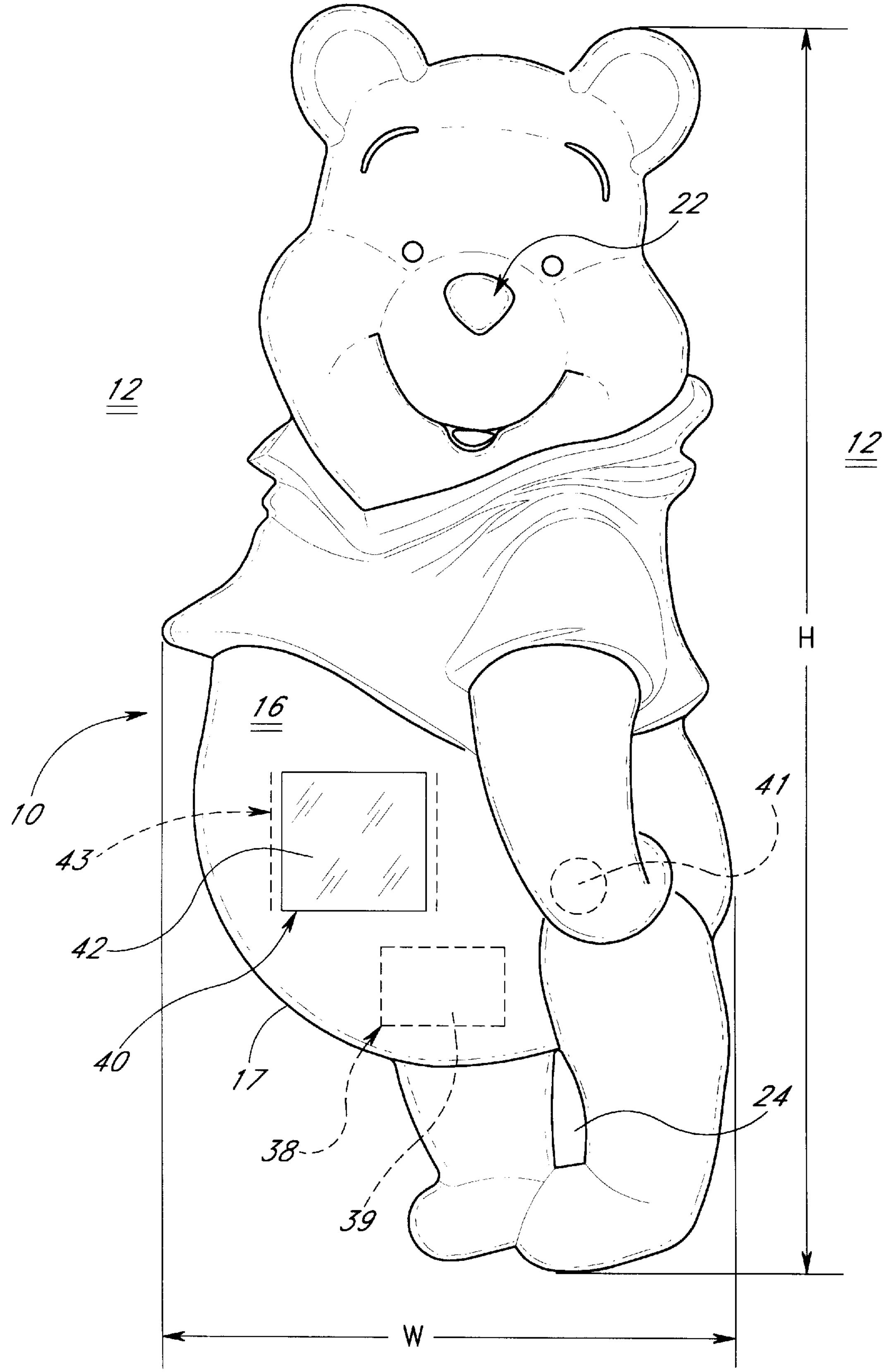
FIG. 5 is an embodiment a soft sculpture wall adornment having an opening for a picture and a concealed sound member and actuator illustrated in phantom.

While the illustrated embodiment shows a preferred soft sculpture wall adornment 10, other variations are also possible. As shown in FIG. 5, for instance, a hollow portion 38 may be formed in the adornment 10 to house selectively operable lights and/or sound producing members 39, such as, for example, but without limitation, voice boxes, music boxes, sound boxes, and the like. A switch 41 that can be remotely mounted, concealed, or exposed, or otherwise suitably arranged may actuate these special features. Thus, another aspect of the present invention involves providing a pressure-sensitive switch 41 which can be concealed within the soft sculpture adornment 10 at least in part. The switch 41 is preferably arranged such that pressing on the front surface in a selected region of the adornment 10 can activate the special effect. Desirably, the lights voice boxes, music boxes, and sound boxes 39 can also be concealed, at least partially, within the soft sculpture adornment 10. Additionally, according to another aspect of the present invention, the soft sculpture wall adornment 10 may form a picture frame with a recess 40 provided into which a picture may be placed. The recess 40 may be provided with a glass cover 42 or any other suitable translucent or transparent material to protect the picture provided by the user. To insert the picture and glass cover, the wall adornment is flexed such that the recess 40 is convexly shaped. This bending expands a retaining structure 43 such that the glass cover 42 may be positioned into the retaining structure 43. The glass cover 42 is then held in place over the picture once the wall adornment is released and returned to its normal relaxed configuration. Thus, once in place upon the wall, the picture and glass cover 42 are securely held in place. Preferably, only by removing the wall adornment from the wall and flexing the wall adornment can the glass cover 42 and the encased picture be removed from the recess.

Figure 6:
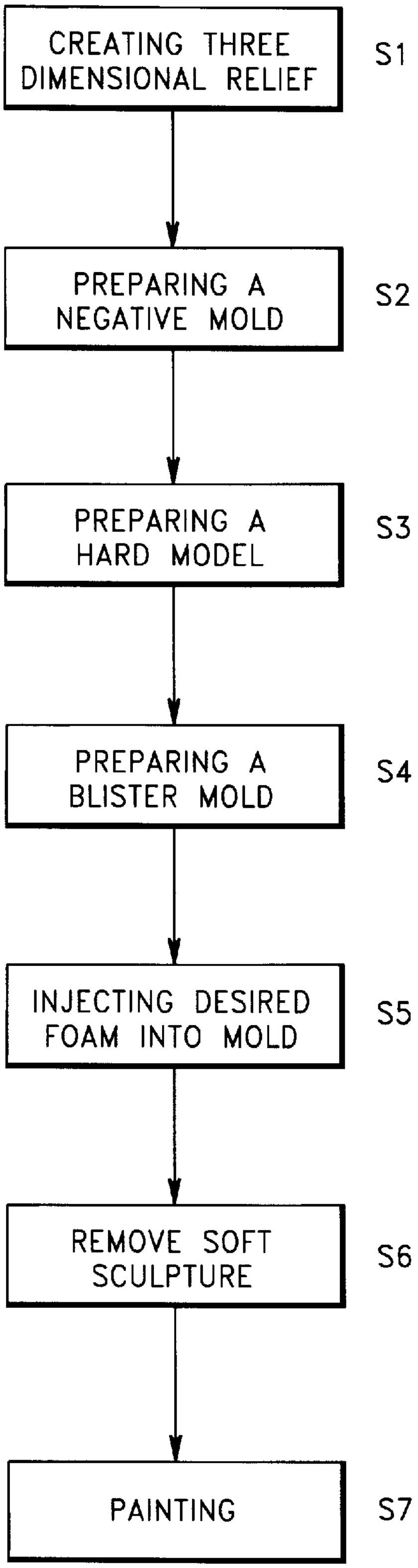
FIG. 6 is a flow chart illustrating a method of manufacturing a soft sculpture wall adornment.
Figure 3:
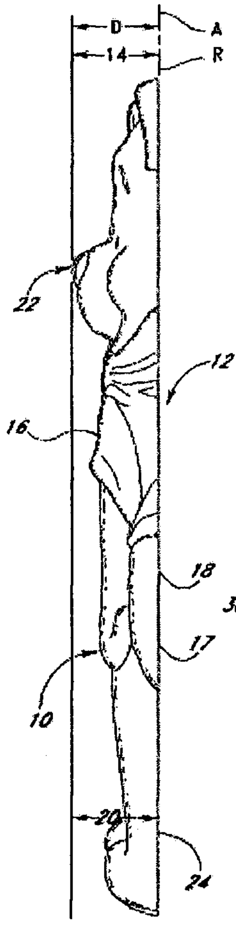
Figure 4:
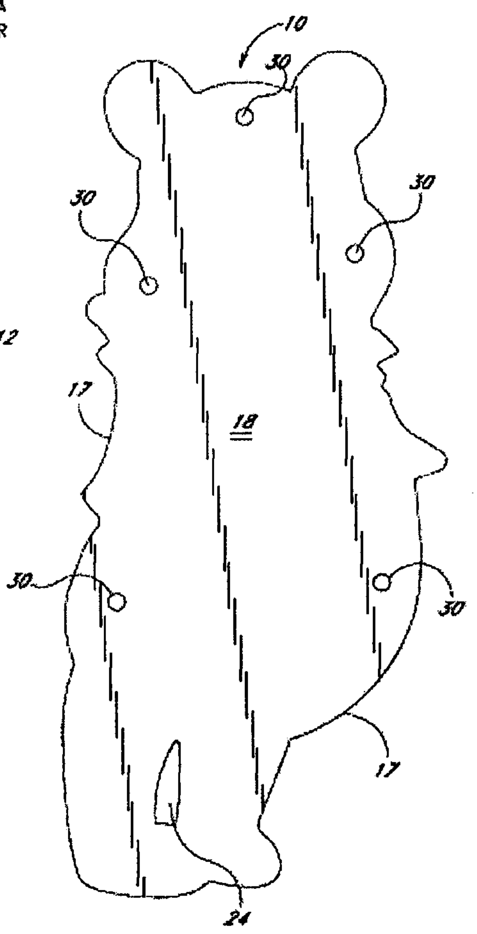

With reference to FIG. 6, a preferred method of manufacturing the disclosed adornment 10 is detailed in a flow diagram. To manufacture the soft sculpture adornment 10, a clay model is first formed which reflects the desired shape and configuration of the soft sculpture. (S1) In the present invention, the desired configuration has been detailed above. Importantly, overall design shape (i.e., bear, mouse, and duck) can be utilized. Once a three-dimensional relief model has been prepared, a negative mold is created of the model in a manner well known to those of skill in the art. (S2)

The negative mold is then utilized to create a hard model of the soft sculpture (S3). The hard model is typically formed of some type of resin. Before progressing to make a final production mold, the hard model can be sanded to reduce imperfections, if possible. Once the hard model is ready, a blister mold is made which will become the production mold. (S4) The blister mold is typically formed by vacuum-forming polypropylene or by any other suitable process. The blister mold produces a top portion and bottom portion that are combined to create an enclosed chamber.

The foam and the chamber are then prepared. In one embodiment, the foam is impregnated with dye that substantially matches the base color of the final soft sculpture. The chamber is coated with a barrier coat to provide a paint-receptive smooth skin. Once both the chamber and the foam are prepared, the foam is injected into the chamber. (S5) Upon curing, the soft sculpture is removed from the mold. (S6)

The soft sculpture may then be painted using any suitable method, such as, but not limited to, masking and spraying or hand painting. (S7) Preferably, the masking is performed utilizing electroplated nickel impressions of the soft sculpture which have portions removed that represent each color. Thus, a separate mask is typically utilized for each color.

Finally, the mounting elements 30 may be applied. In one embodiment, the mounting elements 30 are supplied separately for the consumer to apply. In other embodiments, the mounting elements 30 are applied to the soft sculpture in an advantageous arrangement.

Thus manufacture, the present soft sculpture adornment 10 provides a lightweight and safe alternative for decorating walls 12. The present soft sculpture is designed to be safe for use around children of all ages. Moreover, the mounting elements 30 utilized in the presently preferred embodiments allow the soft sculpture wall adornment 10 to be repeatedly moved and removed. Advantageously, the overall configuration of the soft sculpture wall adornment 10 results in a three-dimensional presentation that reduces the odd appearance of full three-dimensional reproductions and the associated harsh shadows.

Although this invention has been described in terms of a certain embodiment, other embodiments apparent to those of ordinary skill in the art also are within the scope of this invention. For instance, the present wall adornment can also be configured as a water toy having the capability to squirt water from an internal reservoir and adhere to the side of a wall through adhesion. Such a configuration would be buoyant and could be configured as a puzzle. Additionally, another configuration would allow purchasers to paint the wall adornment through a paint-it-yourself type of kit. Finally, the wall adornment could be painted or impregnated to allow the wall adornment to glow in the dark. Thus, various changes and modifications may be made without departing from the spirit and scope of the invention. Importantly, some of the following claims may encompass some of the above-identified aspects and objects of the invention while not encompassing all of the aspects and objects. Accordingly, the proper scope of the protected invention is intended to be defined only by the claims that follow.

What is claimed is:

1. A soft sculpture wall adornment comprising a pliable unitary portion having a raised front surface, a mounting plane defined by a plurality of points adapted to abut against a surface against which the wall adornment is mountable, a contrast reference plane substantially parallel to the mounting plane and containing at least one point of the front surface closest to the mounting plane, the raised front surface having varying levels of relief relative to the contrast reference plane and having a minimum total relief contrast of about 0.5 inches such that a three-dimensional effect is achieved.

2. A soft sculpture wall adornment of claim 1 wherein the unitary portion is made from a member of the group consisting of ethyl vinyl acetate, poly vinyl chloride, urethane, open celled foam, and closed cell foam.

3. A soft sculpture wall adornment of claim 1 wherein the unitary portion further comprises rear surface which is substantially planar.

4. A soft sculpture wall adornment of claim 1 wherein the rear surface is substantially coplanar with the reference plane.

5. A soft sculpture wall adornment of claim 1 further comprising a mounting element.

6. The soft sculpture wall adornment of claim 5 wherein the mounting element further comprises a double-sided adhesive portion.

7. The soft sculpture wall adornment of claim 1 wherein the unitary portion has a maximum thickness that is less than about 3 inches.

8. The soft sculpture wall adornment of claim 1 further comprising a weight of less than about 18 ounces.

9. The soft sculpture wall adornment of claim 1 further comprising a selectively operable sound producing member which is at least partially concealed and a pressure-sensitive actuator connected to the sound producing member, the pressure-sensitive actuator being at least partially concealed and capable of manipulation through the unitary portion.

10. The soft sculpture wall adornment of claim 1 further comprising selectively operable lights.

11. The soft sculpture wall adornment of claim 1 wherein the unitary portion defines an opening for a picture receptacle such that the wall adornment can function as a picture frame.

12. The soft sculpture wall adornment comprising a varying relief portion and a mounting surface, a mounting plane defined by a plurality of points adapted to abut against a surface against which the wall adornment is mountable, a contrast reference plane substantially parallel to the mounting plane and containing at least one point of the front surface closest to the mounting plane, the varying relief portion being pliable and lightweight, the varying relief portion being a single element and having varying surface heights relative to the contrast reference plane and having a minimum average total relief contrast of about 0.5 inches such that a three-dimensional effect is achieved by a substantial portion of the varying relief portion.

13. The soft sculpture wall adornment of claim 12 wherein the relief portion has a planar mounting surface.

14. The soft sculpture wall adornment of claim 13 wherein the planar mounting surface is substantially coextensive with the relief portion.

15. The soft sculpture wall adornment of claim 13 wherein the double-sided adhesive mounting element is secured to the planar mounting surface.

16. The soft sculpture wall adornment of claim 15 wherein the tack of the double-sided adhesive element has a higher strength on the relief portion side and a lower strength on the side which will mount to a surface.

17. The soft sculpture wall adornment of claim 12 further comprising a weight that is less than about 18 ounces.

18. The soft sculpture wall adornment of claim 12 wherein the relief portion is a component of a larger soft sculpture.

19. The soft sculpture wall adornment of claim 12 further comprising a selectively operable sound-producing member that is at least partially concealed.

20. The soft sculpture wall adornment of claim 19 further comprising a pressure-sensitive actuator button, the button being arranged such that it can be actuated through the relief portion.

21. The soft sculpture wall adornment of claim 12 wherein the relief portion defines an opening to a picture receptacle such that the wall adornment can function as a picture frame.

22. The soft sculpture wall adornment of claim 12 further comprising selectively operable lights.

* * * * *

UNITED STATES PATENT AND TRADEMARK OFFICE

CERTIFICATE OF CORRECTION

Figure 3:
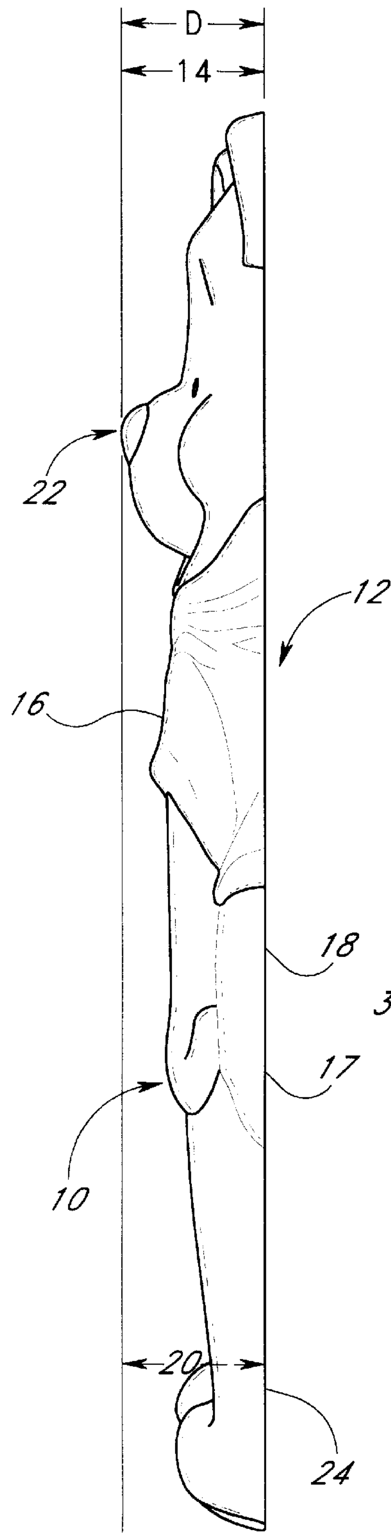
FIG. 3 is a side elevational view of the adornment of FIG. 1 with an exemplary wall shown in cross-hatch for providing an environment to use.
Figure 4:
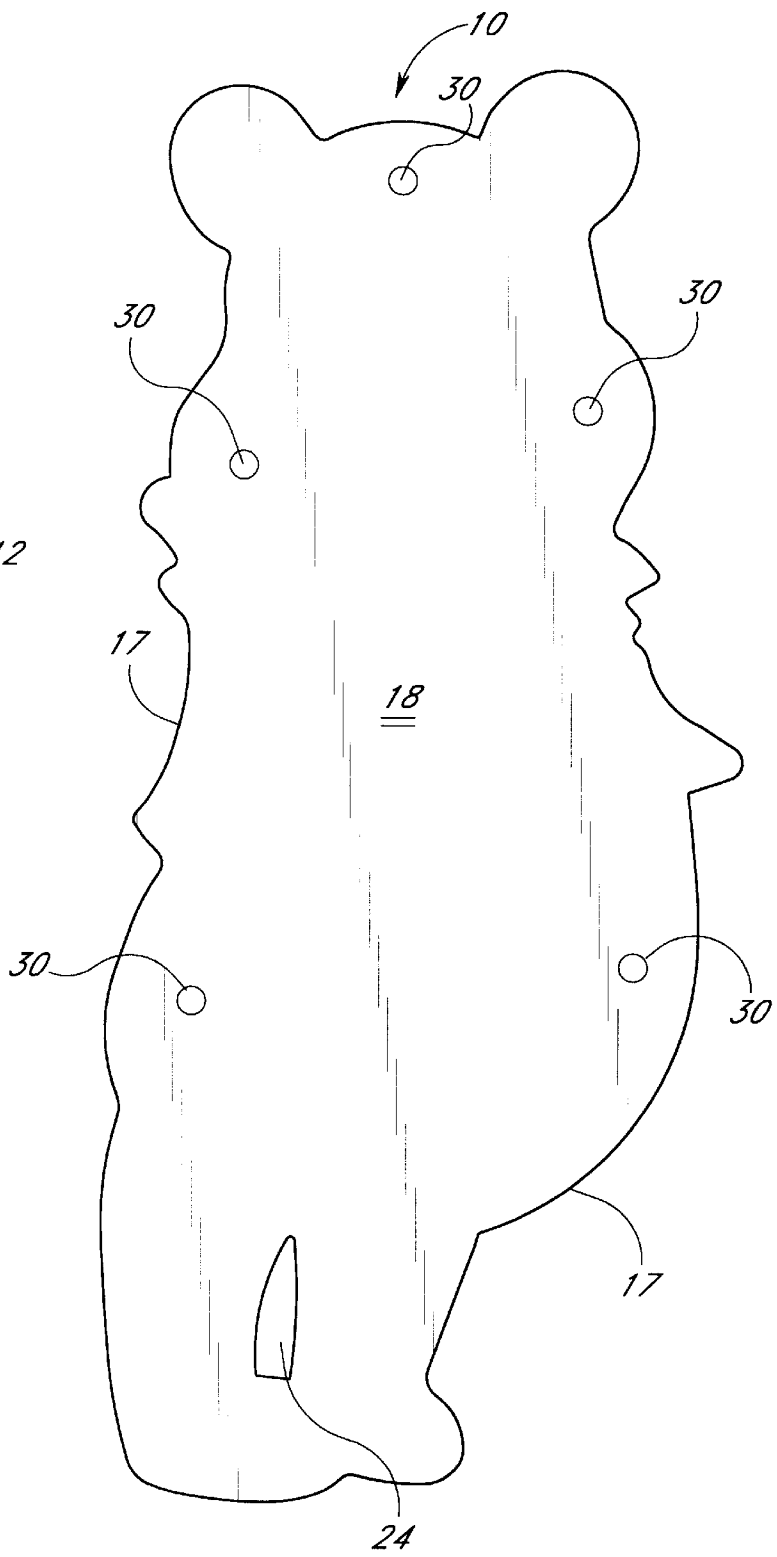
FIG. 4 is a rear elevational view of the adornment of FIG. 1.

PATENT NO. : 6,132,821
APPLICATION NO. : 09/159445
DATED : October 17, 2000
INVENTOR(S) : Dan A. Garr It is certified that error appears in the above-identified patent and that said Letters Patent is hereby corrected as shown below:

Drawings:

Delete Fig. 3 and substitute Fig. 3 as shown on the attached page

Signed and Sealed this
Eighteenth Day of October, 2011

David J. Kappos
*Director of the United States Patent and Trademark Office*